United States Patent

Snellman

[11] Patent Number: 6,120,186
[45] Date of Patent: Sep. 19, 2000

[54] LIGHTER BEARING ASSEMBLY

[75] Inventor: Jorma Snellman, Jyväskylä, Finland

[73] Assignee: Valmet Corporation, Helsinki, Finland

[21] Appl. No.: 09/294,650

[22] Filed: Apr. 19, 1999

[30] Foreign Application Priority Data

Apr. 20, 1998 [FI] Finland ..................................... 980866

[51] Int. Cl.[7] .................................................. F16C 17/02
[52] U.S. Cl. .......................... 384/151; 384/322; 384/905
[58] Field of Search ..................................... 384/151, 322, 384/905, 493, 557

[56] References Cited

U.S. PATENT DOCUMENTS 5,267,798  12/1993  Budris ..................................... 384/278
5,649,889  7/1997   Warner.

FOREIGN PATENT DOCUMENTS 2 105 416A  3/1983  United Kingdom ............ F16C 27/00

*Primary Examiner*—Lenard A. Footland
*Attorney, Agent, or Firm*—Fildes & Outland, P.C.

[57] ABSTRACT

The invention relates to a lighter bearing assembly, in which the bearing includes an outer sleeve and an inner sleeve that rotate in relation to each other, the outer sleeve being set in a bearing block and the inner sleeve being set on a shaft, and one of the sleeves being arranged for axial movement relative to its support surface, and a pocket being arranged in the movement surface thus formed, to which a lubrication channel extends, to facilitate axial movement, such as that due to thermal expansion, the pocket being formed by a sealed area that delimits part of the movement surface.

11 Claims, 4 Drawing Sheets

LIGHTER BEARING ASSEMBLY

FIELD OF THE INVENTION

This invention relates to a lighter bearing assembly, in which the bearing includes an outer sleeve and an inner sleeve that rotate in relation to each other, the outer sleeve being set in the bearing block and the inner sleeve set on the shaft, and one of which is adapted for relative axial movement with its support surface, and there is a pocket arranged in the movement surface thus formed, to which a lubrication channel extends, in order to facilitate the aforesaid axial movement, for instance, movement caused by thermal expansion.

BACKGROUND OF THE INVENTION

In large and heavily loaded bearings, the forces of friction between the moving parts are also large. Bearings of this kind are used, for example, in the press rolls of a paper machine. In particular, the friction due to the thermal expansion of the shaft is a problem in bearings that permit free axial movement. This problem does not arise in hydrostatic bearings, because a layer of lubricating oil is often also arranged between the outer sleeve and the bearing block. In this case, the entire bearing can move axially within the bearing block and adjust to variations in the length and angle of the shaft. Special pockets are used to distribute the lubricant.

Thermal expansion can be eased in the aforementioned hydrostatic bearings, but there are no simple means to lighten other types of bearings. If the inner sleeve of the bearing can rotate, the outer sleeve of the bearing is fitted to the bearing block with a sliding fit and the inner sleeve with a tight fit. In this case, it is intended that the thermal expansion of the bearing will be accommodated through the relative movement of the outer sleeve and the bearing block. Correspondingly, if the outer sleeve can rotate, it is intended that the thermal expansion will be accommodated through the relative movement of the shaft collar and the inner sleeve of the bearing. However, large friction forces may prevent this movement, when great stresses will be imposed on the bearing members. The bearing will be loaded, even if no axial force acts on the shaft. The additional stress reduces the operating life of the bearing and may even lead to structural failure.

SUMMARY OF THE INVENTION

The present invention provides a lighter bearing assembly, which permits the axial movement of the shaft, particularly that due to thermal expansion, despite a large bearing load.

More specifically, the lighter bearing assembly includes an outer sleeve and an inner sleeve that rotate in relation to each other. The outer sleeve is set in a bearing block and the inner sleeve is set on a shaft. One of the sleeves is arranged for axial movement relative to its support surface, and a pocket is arranged in a movement surface thus formed, to which a lubrication channel extends, to facilitate axial movement, such as that due to thermal expansion. The pocket is formed by a sealed area that delimits part of the movement surface.

In one embodiment, the pocket extends for 60–90% of the longitudinal direction of shaft, 70–80% of the length of the movement surface in the direction of the shaft and, in the circumferential direction, covers essentially the entire loaded side of the cross section of said movement surface.

The sealed area is formed by a seal, which is fitted in grooves arranged in the movement surface. Grooves may be arranged in the movement surface, in either the bearing block or the outer sleeve. Grooves may be arranged in the movement surface, either in the shaft or the inner sleeve.

In the end of the channel ending in the pocket there is a valve, which is arranged to cut off the lubricant feed, when a lubricant layer achieves the desired thickness. The valve is normally in the closed position and that it is arranged to open, when the spindle of said valve is pressed inwards. Preferably, the valve is essentially in the center of the pocket on the vertical center line of the shaft.

The channel includes a counter-valve, to prevent the lubricant from leaving the pocket through the channel. In journal bearings, especially in articulated bearings, a second pocket is also arranged between the outer sleeve and the inner sleeve, to which a second channel with a counter-valve extends.

Preferably, the lubricant is lubricating grease.

According to the invention, the lighter assembly is located between the bearing member and its support surface, and can be applied to different types of bearing. With the lighter assembly, the friction surfaces adapted to move axially in relation to each other are separated from each other, so that the friction is small. In this case, the axial movement is delicate and the bearing and its attachments are not unnecessarily loaded. The lighter assembly according to the invention is based on the use of a lubricant, which, however, does not require complicated lubricating channels. In addition, the lighter assembly can be achieved using either continuous or interval lubrication.

These and other features and advantages of the invention will be more fully understood from the following detailed description of the invention taken together with the accompanying drawings.

DETAILED DESCRIPTION OF THE INVENTION

Figure 1:
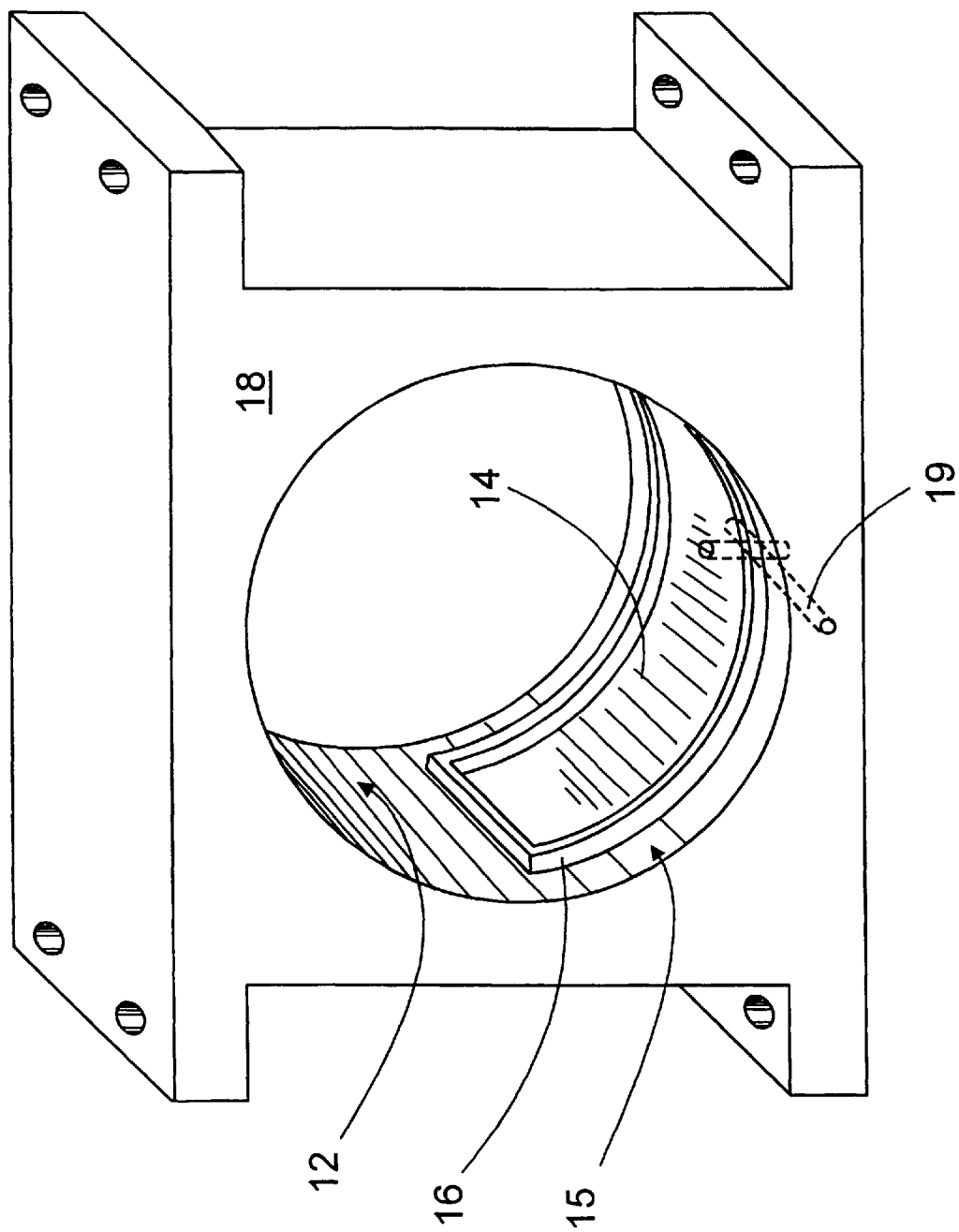
FIG. 1 is an axonometric front view of a bearing block and a pocket formed by a seal, in accordance with the invention.

Referring now to the drawings in detail, FIG. 1 shows a diagram of the bearing trunnion 18 and the incorporated bearing block 12, which acts as a support surface for outer sleeve 10 of the bearing. In this embodiment, the bearing is also arranged to move axially within bearing block 12, as a movement surface is formed between bearing block 12 and bearing outer sleeve 10. In order to lighten the axial movement, a seal 16 is arranged in bearing block 12, forming a closed pocket 14 between bearing block 12 and outer sleeve 10. The actual lighter assembly according to the invention is achieved by leading lubricant into pocket 14. Generally, pocket 14 according to the invention is formed by the seal area 15 that delimits part of the movement surface. Preferably, the pocket is located on the loaded side of the bearing, so that the center line of the pocket coincides with the center line of the bearing load.

Seal area 15 is formed by seal 16, which is installed in grooves 17 machined in the inner surface of the bearing block 12. In FIG. 1, the thickness of seal 16, in relation to the rest of the construction, has been exaggerated for the sake of clarity. Because there is no rotational movement between outer sleeve 10 and the bearing block 12, the wear of seal 16 is not a problem. In addition, the grooves 17 are machined to such a depth that the entire seal 16 is able to press down to the level of bearing block 12. In this case, when pocket 14 is emptied, seal 16 is not broken, even if the outer sleeve 10 touches bearing block 12. If necessary, the rotation of outer sleeve 10 within bearing block 12 is prevented.

In embodiments in which the shaft rotates, the grooves are arranged in either the bearing block or the outer sleeve. If the bearing block rotates, the grooves are arranged in either the shaft or the inner sleeve. Generally, the lighter assembly is arranged between the non-rotating bearing components and its counter-surface, in which case the wear of the seal and the consumption of grease are minimal.

Figure 4:
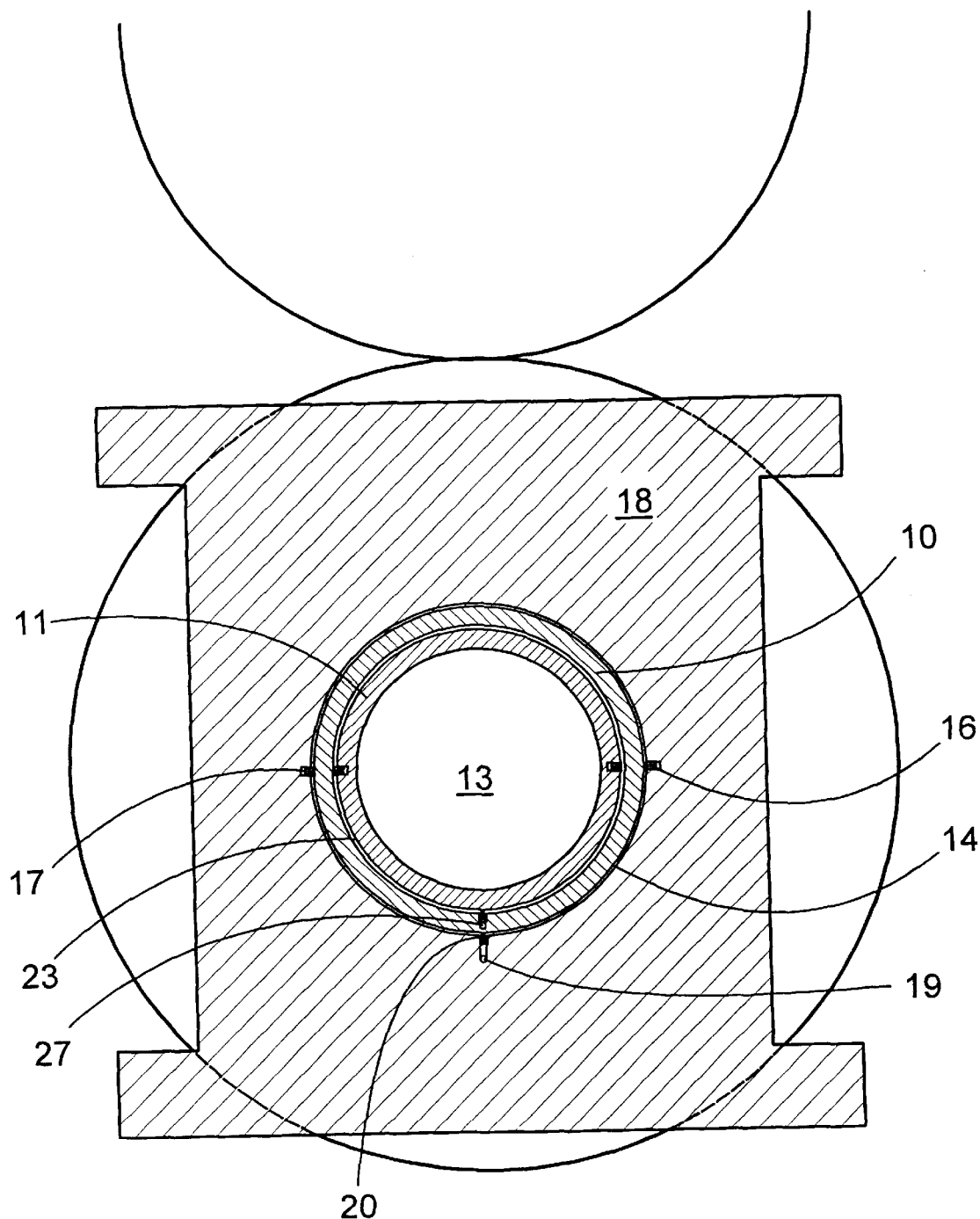
FIG. 4 is the arrangement in FIG. 3, shown in cross section.

High-pressure lubricant is led to pocket 14 along channel 19 machined in the bearing trunnion 18. Lubricating grease is preferably used as the lubricant, because grease retains its lubricating properties better than other lubricants on heavily loaded movement surfaces. When grease is being fed, seal 16 tends to press against the surface of outer sleeve 10, which improves the tightness of the seal and thus reduces grease consumption. In addition, the surface area of pocket 14 is made as large as possible, to create a sufficient lifting force. Thus, pocket 14 extends for 60–90% of the longitudinal direction of shaft 13, preferably for 70–80% of the length of the movement surface in the direction of shaft 13. At the same time, in a circumferential direction, it covers essentially the entire loaded side of the cross section of the movement surface (FIG. 4).

Figure 2:
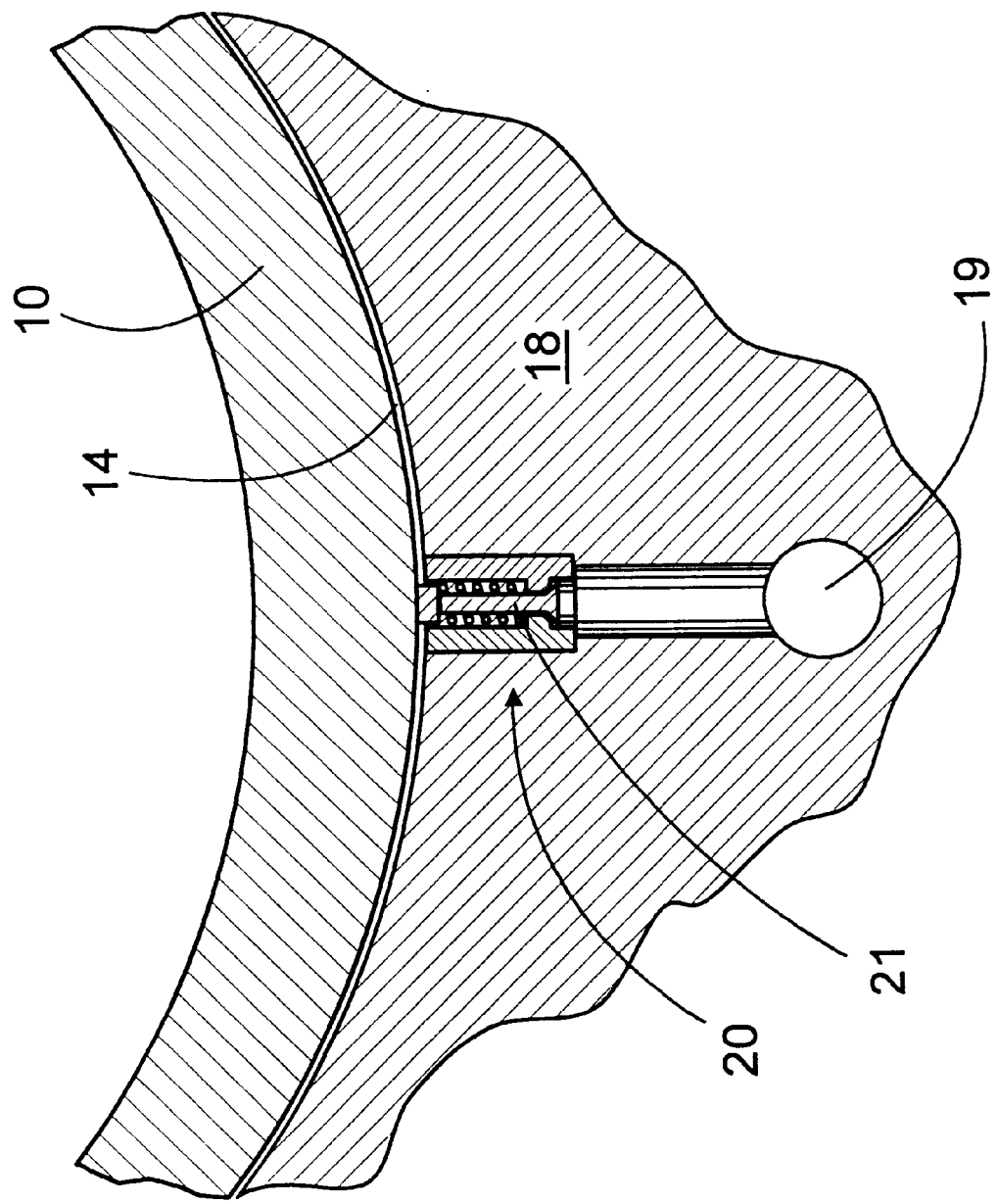
FIG. 2 is a cross section of a valve installed in the channel.

Channel 19 opens into the center of pocket 16, essentially at the vertical centerline of shaft 13. In this case, the spindle 21 of valve 20 at the end of channel 19, shown in FIG. 2, extends first to the surface of outer sleeve 10, because the movement of shaft 13 and thus also outer sleeve 10 is in the direction of the bearing force, in this case mainly vertical. In addition, valve 20 is arranged to open when spindle 21 is pushed inwards. At the same time, the centrally located channel 19 distributes grease evenly to pocket 14. The high-pressure grease is used to keep the opposing surfaces of the loaded sides apart from each other, when the friction is reduced. Thus, the lighter assembly does not employ circulating oil lubrication, but a static cushion of grease. Pressure is maintained in pocket 14 by a continuous supply of oil or by counter-valve 22 in channel 19. The grease is fed by a suitable device, by means of which a sufficient pressure is achieved in pocket 14.

Due to its construction, valve 20 cuts off the supply of grease once the layer of grease has achieved the desired thickness. In this way, the grease fed to channel 19 can be continuous, without, however, loading pocket 14 unnecessarily. In fact, spring-loaded valve 20 is normally in the closed position. On the other hand, not only channel 19 but also counter-valve 22 prevents the grease from leaving pocket 14 through channel 19, so that the pressure in pocket 14 is maintained. When the pressure gradually drops as the grease is used up, a layer of grease nevertheless remains on the movement surface, substantially reducing friction.

Figure 3:
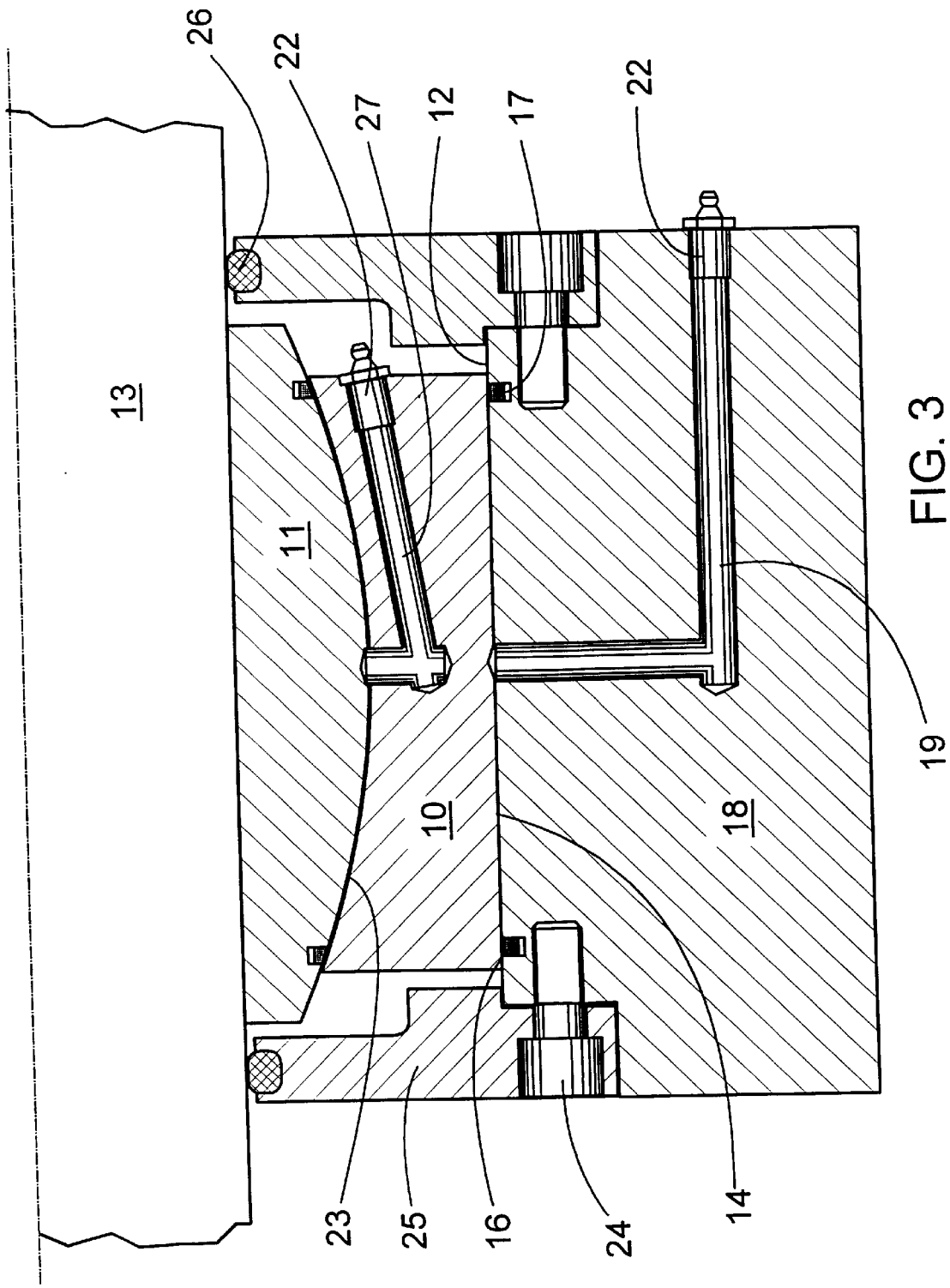
FIG. 3 is a longitudinal section of the bearing arrangements equipped with a pocket according to the invention.

FIG. 3 shows an articulated bearing embodiment in the press roll of a paper machine. Besides a lighter assembly between the bearing block 12 and the outer sleeve 10, the embodiment is also lightened between the movement surfaces of the joint bearing. The solution in question facilitates rotation of the inner sleeve 11, permitting deviation in the angle of shaft 13. In FIG. 3, the counter-valves 22 are the grease nipples at the ends of channels 19 and 27. Grease is added to pockets 14 and 23 at regular intervals, but continuous pressure feed is also possible. The embodiment also includes valves (not shown) according to the invention that prevent overfilling. In addition, the bearing trunnion 18 has the normal end plates 25 with seals 26, secured by bolts 24. In other journal bearings too, besides the articulated joint shown, there may be a corresponding pocket between the outer and inner sleeves, to which a channel with valves extends. FIG. 4 shows a cross section of the bearing embodiment described above.

In this case, the second example of an embodiment is an articulated bearing, but the bearing lighter assembly according to the invention can also be embodied in bearings of other types. The location of the grooves may vary in different embodiments, but the embodiments described here are economical to manufacture. It is then possible to install the bearing without additional machining. In this way, the size of the pocket is also made as large as possible. When a bearing is changed, it is also possible to change the seals.

Although the invention has been described by reference to a specific embodiments, it should be understood that numerous changes may be made within the spirit and scope of the inventive concepts described. Accordingly, it is intended that the invention not be limited to the described embodiments, but that it have the full scope defined by the language of the following claims.

What is claimed is:

1. A lighter bearing assembly including an outer sleeve and an inner sleeve that rotate in relation to each other, the outer sleeve being set in a bearing block and the inner sleeve being set on a shaft, and one of said sleeves being arranged for axial movement relative to its support surface, and a pocket being arranged in a movement surface thus formed, to which a lubrication channel extends, to facilitate axial movement, such as that due to thermal expansion, characterized in that said pocket is formed by a sealed area that delimits part of said movement surface.

2. A lighter bearing assembly according to claim 1, characterized in that said pocket extends for 60–90% of the longitudinal direction of shaft, 70–80% of the length of the movement surface in the direction of the shaft and, in the circumferential direction, covers essentially the entire loaded side of the cross section of said movement surface.

3. A lighter bearing assembly according to claim 1, characterized in that said sealed area is formed by a seal, which is fitted in grooves arranged in said movement surface.

4. A lighter bearing assembly according to claim 3, characterized in that said grooves are arranged in said movement surface, in one of said bearing block and said outer sleeve.

5. A lighter bearing assembly according to claim 3, characterized in that said grooves are arranged in said movement surface, in one of said shaft and said inner sleeve.

6. A lighter bearing assembly according to claim 1, characterized in that in the end of said channel ending in the pocket there is a valve, which is arranged to cut off the lubricant feed, when a lubricant layer achieves the desired thickness.

7. A lighter bearing assembly according to claim 6, characterized in that said valve is normally in the closed position and that it is arranged to open, when the spindle of said valve is pressed inwards.

8. A lighter bearing assembly according to claim 6, characterized in that said valve is essentially in the center of the pocket on the vertical center line of the shaft.

9. A lighter bearing assembly according to claim 1, characterized in that said channel includes a counter-valve, to prevent the lubricant from leaving said pocket through said channel.

10. A lighter bearing assembly according to claim 9, characterized in that in journal bearings, especially in articulated bearings, a second pocket is also arranged between said outer sleeve and said inner sleeve, to which a second channel with a counter-valve extends.

11. A lighter bearing assembly according to claim 1, characterized in that the lubricant is lubricating grease.

* * * * *